No. 746,200. PATENTED DEC. 8, 1903.
E. G. THOMAS.
AUTOMATIC WEIGHING MACHINE.
APPLICATION FILED MAY 20, 1898.
NO MODEL. 3 SHEETS—SHEET 2.
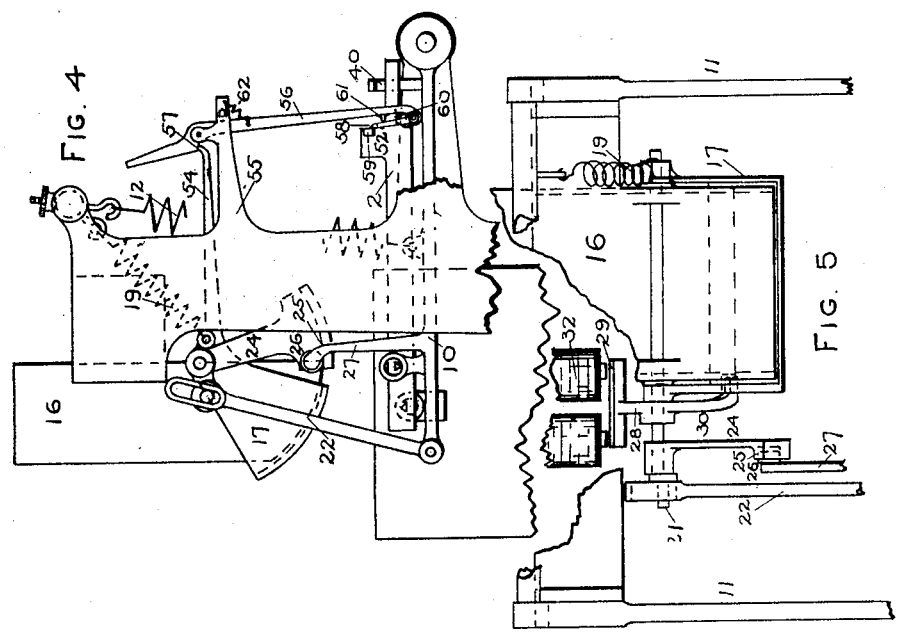
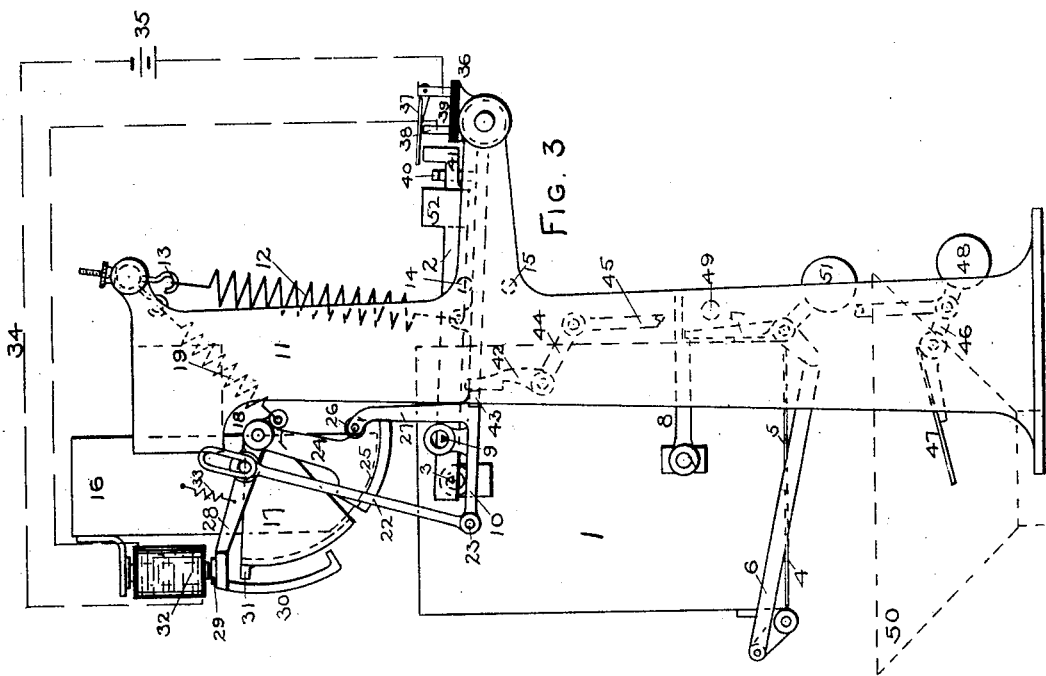
WITNESSES
Timothy W. Sprague
Geo. B. Glidden
INVENTOR
Edward G. Thomas No. 746,200. PATENTED DEC. 8, 1903.
E. G. THOMAS.
AUTOMATIC WEIGHING MACHINE.
APPLICATION FILED MAY 20, 1898.
NO MODEL. 3 SHEETS—SHEET 3.
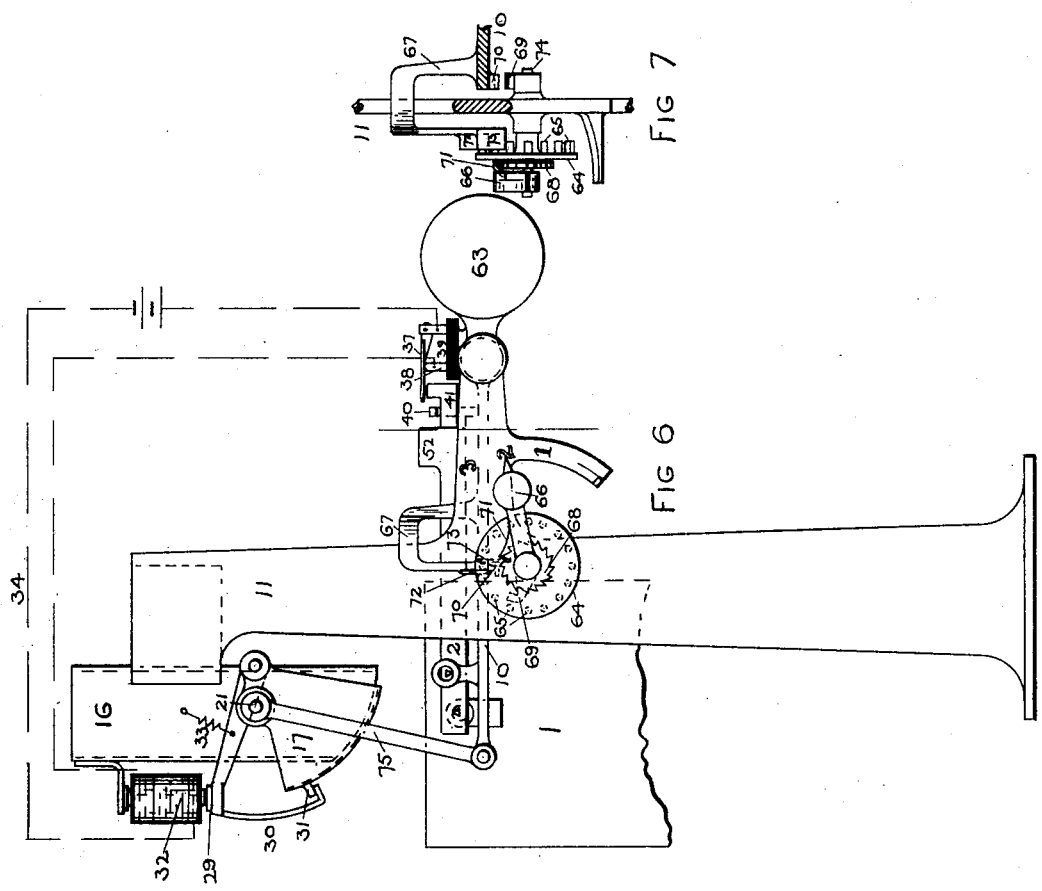
WITNESSES
INVENTOR No. 746,200. Patented December 8, 1903.

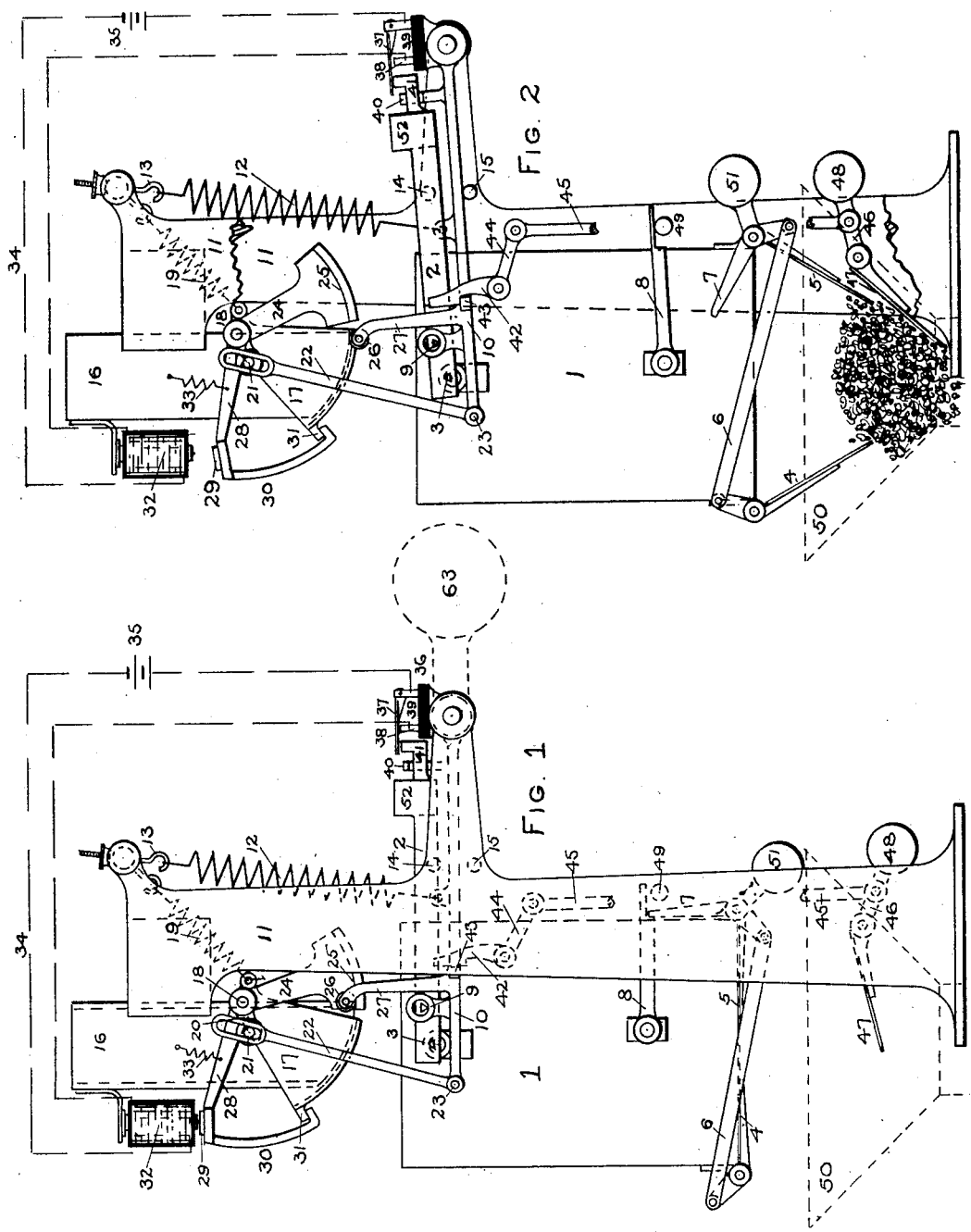

UNITED STATES PATENT OFFICE.

EDWARD G. THOMAS, OF BOSTON, MASSACHUSETTS, ASSIGNOR, BY MESNE ASSIGNMENTS, TO AUTOMATIC WEIGHING MACHINE COMPANY, OF NEW YORK, N. Y., A CORPORATION OF NEW YORK.

AUTOMATIC WEIGHING-MACHINE.

SPECIFICATION forming part of Letters Patent No. 746,200, dated December 8, 1903.

Application filed May 20, 1898. Serial No. 681,264. (No model.)

*To all whom it may concern:*

Be it known that I, EDWARD G. THOMAS, a citizen of the United States, residing at Boston, in the county of Suffolk and State of Massachusetts, have invented certain new and useful Improvements in Automatic Weighing-Machines, of which the following is a specification.

My invention is intended to provide an improved automatic weighing-machine of that type in which the moving parts are actuated wholly by power derived from the weight of the material which passes through the apparatus as distinguished from weighing-machines of the power-driven type. In machines of the latter class the contents of the weighing-bucket or other receptacle at the time of the completion of a full load is not ordinarily relied upon to perform any function other than that of tilting the scale-beam, whereby very accurate results are obtainable by reason of the elimination of sources of error, such as frictional or other resistance to the descent of the loaded receptacle, when such movement is relied upon to effect the cutting off of the supply of material to the receptacle.

It is a main object of my present invention to secure without the use of positive driving mechanism the accurate results obtainable from power-driven machines; and to this end I provide a valve or other flow-controlling device and means constantly tending to close the same when open, in combination with devices for opening the valve, which are operated after the weighing-bucket or other receptacle has received a full load and has been emptied by the weight of a counterbalance or other force which has been made operative for such purpose by the downward movement of the receptacle in such manner that at the time of the completion of each load the scale-beam is free to move uninfluenced by any resistance except that of a device for releasing and permitting the final closing of the valve, which resistance may be made so slight as to be negligible.

My invention also comprises improved means for dumping the weighing-bucket, as well as certain other subordinate features hereinafter set forth.

An automatic weighing-machine embodying a preferred form of my invention is illustrated in the accompanying drawings, which are to some extent diagrammatic and are not intended to represent the exact details of commercial construction.

In said drawings, Figures 1, 2, and 3 represent in side elevation one form of machine in three different positions assumed during one complete operation. Fig. 4 is a fragmentary view, in side elevation, showing a modified construction. Fig. 5 is a rear elevation of a portion of the machine shown in Fig. 1 in the same position. Fig. 6 is a view in side elevation of a portion of a modified form of machine provided with a device for governing the number of complete operations which the machine will perform automatically after being started, and Fig. 7 is a sectional view of the governing device shown in Fig. 6.

Weighing-machines as hitherto constructed have in many cases been provided with means for effecting a partial closing of the valve which controls the delivery of material to the weighing-bucket before a full load has been obtained in order that the bulk of the material might be delivered to the scale at a rapid rate, the rate of flow at the time of the final closing of the valve being thus diminished in order that more accurate weights might be obtained, and in the machine shown in the drawings the same principle is embodied, although the main features of my invention are applicable to weighing-machines in which no intermediate position of the valve is provided for.

Referring now to the drawings, the machine shown therein comprises a weighing-bucket 1, supported on a scale-beam 2 by means of knife-edges 3, and provided with a bottom adapted to be opened at the proper time to discharge the material weighed. This bottom is preferably composed of two sections 4 and 5, pivoted, respectively, to opposite sides of the bucket and so connected by a link 6 that they will open and close in unison. One of the sections 5 is provided with means, such as a weight 51, for closing the bottom of the bucket after it has been emptied and with an arm 7, arranged to be engaged when said bottom is closed by a latch 8, pivoted on the bucket. The scale-beam 2 is provided with a weighing-weight 52 and with knife edges 9, and is supported by the latter, as hereinafter described.

To the upper part of the framework of the machine is secured a chute 16, through which material is delivered to the bucket 1 from any suitable source of supply. The flow of material through this chute is controlled by suitable means, such as a swinging valve 17, rigidly secured to a shaft 18, journaled on the framework of the machine, said valve being provided with means constantly tending to close it, such as a spring 19, secured thereto and to some stationary part of the machine and so adjusted as always to be under tension. Means are thus provided for closing the valve which are wholly independent of the weight of the material weighed and of the movements of the receptacle 1, so that by holding said valve open or partly open until a full load has been delivered and utilizing the movement of the scale thereby produced merely to effect the release of the valve-restraining device I am able to obtain, within certain limits, results of the same degree of accuracy as those heretofore obtained from power-driven machines. For opening the valve in opposition to the closing device 19 and bringing it into a position wherein the restraining device will act upon it I utilize the energy developed by the downward movement of the material weighed, and in order that the movements of the scale-beam 2 on its knife-edges 9 may not be hampered or affected in any way by the valve-opening mechanism I mount said scale-beam on an independently-movable support, the valve-opening mechanism being connected to said support and operated thereby. This support may consist of an oscillatory table 10, pivoted to the sides 11 11 of the framework of the machine and counterbalanced by means, such as a spring 12, secured thereto and to a hook 13, which is preferably adjustable. The movements of the support 10 during the action of the machine are limited by fixed stops 14 and 15. In place of the spring 12 a counterbalancing-weight 63 (shown in dotted lines in Fig. 1) may be employed, if desired, the support 10 thus forming, in effect, a separate scale-beam.

The valve-opening mechanism operated by the support 10, as shown in Figs. 1 to 5, inclusive, consists of a link 22, pivoted at one end, as at 23, to the support 10, and provided at its other end with a slot through which projects a pin 21, attached to an arm 20, which is secured to and moves with the shaft 18. These parts are so proportioned that when the support 10 is in its lowest position the valve 17 will be free to close if permitted so to do, while upon the upward movement of said support said valve will be opened by the engagement of the pin 21 by the link 22 at the lower end of the slot formed therein, and when thus opened will remain open until the support descends again. According to the construction shown in said figures the valve 17 will begin its closing movement as soon as the support 10 commences to descend, which descent by suitably adjusting the spring 12 or the counterweight 63 is caused to occur as soon as the greater part of a load has been delivered to the bucket 1, and for the purpose of holding said valve open to a slight extent until the full load has been completed I provide an arresting device by means of which the valve is held in what may be called the "drip-stream" position until by the movement of the scale-beam 2 upon the completion of the load said arresting device is released and the valve is allowed to close. As shown in Figs. 1, 2, and 3, this arresting device consists of an arm 28, journaled loosely upon the shaft 18 and provided with an armature 29 and an arc-shaped extension 30, which extension has a hook at its lower end adapted to engage a lug 31, secured to the valve 17. An electromagnet 32 is supported on the framework of the machine and so located that when energized it will attract and hold the armature 29 when the arm 28 is in the position shown in Figs. 1, 3, and 6, the valve 17 being then prevented from closing beyond the drip-stream position by the engagement of the lug 31 with the hooked end of the arm 30. A spring 33, light enough to be overpowered easily by the spring 19, tends at all times to draw the armature 29 against the magnet 32, and said magnet is included in an electric circuit comprising wires 34, a battery 35, and a circuit-breaker 36, which is carried by the support 10 and preferably consists of a pivoted lever 37, normally resting upon and making contact with a post 38, mounted upon an insulating-block 39, the parts 37 and 38 being respectively connected with the wires 34. The weighted end of the scale-beam 2 is provided with a projection 41, so located that when it rises upon the completion of a load in the bucket 1 it will engage the lever 37 and lift it from the post 38, thereby breaking the circuit through the magnet 32 and releasing the arm 28, and thus permitting the complete closing of the valve 17. The upward movement of the projection 41 should be limited by a suitable stop 40.

The support 10 will obviously tend to rise as soon as any considerable portion of material after it has been weighed has been discharged from the bucket 1, and since such motion would result in prematurely opening the valve 17 I provide means for locking said support in or near its lowest position until the bucket has discharged its load completely. To this end I provide a hook 42, pivoted to the framework of the machine and arranged to engage a projection 43 upon the support 10 when in its lowest position. Said hook 42 is connected, as by means of an arm 44 and a link 45, to a lever 46, pivoted near the bottom of the machine and carrying a plate 47, which projects into the path of the falling material dumped from the bucket 1. A weight 48 is usually provided on the rear end of the lever 46 and normally overbalances the plate 47, and thereby holds the same in a nearly horizontal position, the hook 42 being thus held out of engagement with the projection 43. Thus when the bucket is dumped the first portions of the material discharged therefrom will by falling upon the plate 47 and overbalancing the weight 48 operate to lock the support 10, as above described, and said support will not be released nor permitted to open the valve 17 to any extent whatever until the charge last delivered to the bucket has been dumped therefrom and has fallen away from the plate 47, thereby giving the bottom of the bucket time to close.

It will be understood that the bottom of the bucket 1 when unlatched is caused to open by the weight of the material resting upon it, and the unlatching of said bottom is effected by the engagement of a fixed stud 49 with the free end of the latch 8 during the downward movement of the filled bucket. In order to insure a sufficient movement of the bucket for this purpose without interfering with the accurate balancing of the scale-beam 2 and to prevent the premature unlatching of said bottom, I provide means for interrupting the downward movement of the support 10 until the final closing of the valve occurs and for then releasing said support and permitting it to finish its downward movement. For this purpose I prefer to employ an arm 24, secured to the shaft 18 and provided at its lower end with a flange 25, formed on the arc of a circle having said shaft for its center. A roller 26 is secured to a post 27, projecting upward from the table 10, and is arranged to engage the flange 25 when the support 10 has moved downward through a portion of its path, whereby said support will be suspended and its downward motion will be arrested until the final closing of the valve 17 is effected, at which time the flange 25, being attached to the shaft 18, will be moved from under the roller 26, and the support 10 and the bucket 1 will drop to their lowest positions. The unbalanced weight of these parts will be amply sufficient to cause the unlatching of the bottom of the bucket, and this action will be performed independently of the scale-beam 2 and after the same has caused the final closing of the valve, so that the accuracy of the weighing operation cannot be affected thereby. I have shown at 50 in dotted lines a hopper which may be employed to receive the weighed material and to conduct it to any desired receptacle.

I will now describe a complete cycle of operations of a machine such as above described, starting from the position shown in Fig. 2. In said figure the parts are shown in that position in which a load of material has been weighed and dumped from the bucket and the last portions of the load are holding down by their weight the plate 47, whereby the hook 42 is held in engagement with the stud 43, so that the support 10 and its connected parts are prevented from rising. As soon as the material has fallen away from the plate 47 said plate will be raised by the weight 48 and the hook 42 will be disengaged from the stud 43, whereupon the support 10, carrying the scale-beam 2 and the bucket 1, will be moved upward against the stop 14 by means of the spring 12 or counterbalance 63. During this upward motion the bottom of the bucket 1 will be closed by the weight 51 and latched. As the support 10 moves upward it will raise the roller 26 above the level of the flange 25 before any motion of said flange or of the other parts attached to the shaft 18 can occur because of the slot in the link 22; but the further motion of the support 10 will bring the bottom of the slot in the link 22 into contact with the pin 21, whereupon the valve 17 and the other parts attached to the shaft 18 will be moved into the position shown in Fig. 3. The arm 28 will be drawn upward by the spring 33 as fast as such motion is permitted until the armature 29 is brought into contact with the magnet 32. Meanwhile the circuit of this magnet will have been completed by the reëstablishment of the contact between the lever 37 and the post 38, since the weighted end of the scale-beam will fall as soon as a load has been dumped from the bucket, so that the armature 29 will be held by the magnet as soon as it has been brought into contact therewith. The parts being now in the position shown in Fig. 3, in which the valve 17 is open to its fullest extent, a large stream of material will be delivered from the chute 16 to the bucket 1 until a sufficient amount of material has passed into said bucket to overcome the force of the spring 12 or counterweight 63, which will occur when an amount slightly less than the desired load has been received by the bucket 1. At this point the support 10, with the parts carried thereby, will begin to descend, and such motion will continue until the roller 26 rests upon the flange 25 of the arm 24. During this downward movement the valve 17 will be closed by the spring 19 as fast as such action is permitted by the motion of the link 22 until the position shown in Fig. 1 has been reached, the valve 17 then being nearly closed, its closing motion being arrested at this point by the engagement of the lug 31 with the hooked end of the arm 30, which will be prevented from moving by the magnet 32. A small or drip stream of material will now flow through the slightly-open valve until the full load has been completed, whereupon the scale-beam 2 will be tilted, thereby breaking at the post 38 the energizing-circuit through the magnet 32 and releasing the armature 29 and arm 28, whereby the valve 17 will also be released and will instantly be closed by the spring 19. Simultaneously with the final closing motion of the valve the flange 25 will be moved from under the roller 26, and thereupon the support 10 will drop into the position shown in Fig. 2, in which position it will be supported by the stop 15. During this downward movement the latch 8 will be lifted by engaging with the pin 49, whereupon the weight of material in the bucket will force open its bottom, and said material will be dumped therefrom, and by falling upon the plate 47 will depress the same, and thus lock the support 10 in its lowest position, the parts being thus brought back into the position shown in Fig. 2.

In Fig. 4 I have shown a modification in which the electrical device for releasing the valve has been replaced by a mechanical trip for the same purpose. In this modification an arm 54 is secured to the valve 17, and upon an extension 55 of the framework of the machine a lever 56 is pivoted, being provided with a projection or shoulder 57, adapted to engage the free end of the arm 54 when the valve is in its nearly-closed or drip-stream position, as shown. A pawl 58 is pivoted to the bottom of the lever 56, and upon the rear end of the scale-beam 2 is a lug 59, adapted to engage the pawl 58 when that end of the scale-beam is in its lowest position. A spring 60 normally holds the pawl 58 against a projection 61 upon the lever 56. As thus constructed when the full weight in the bucket 1 has been completed and the scale-beam 2 is thereby caused to tilt the lug 59 will be moved out of the path of the lever 56, and the upward pressure of the arm 54 upon the shoulder 57 will swing said lever until said arm 54 is free to rise, whereupon the valve 17 will be instantly closed by the spring 19, the remaining parts of the machine being precisely similar to those shown in Figs. 1, 2, and 3 and their mode of operation being the same. Upon the return of the support 10 to its uppermost position the valve 17 will be opened, and the arm 54 will be moved downward sufficiently far to allow the lever 56 to be moved under the action of a spring 62 into position to engage said arm 54 again when the valve is partially closed into the drip-stream position.

While I have illustrated my invention in connection with a dumping-bucket, it will be obvious that this feature is not essential to the action of the remaining parts of the apparatus and that there may be substituted for it a scale-pan upon which any desired receptacle may be placed. My invention may also be modified in respect to many other parts and details, as will be apparent, particularly in respect to the form of the valve 17 and the means for controlling its closing movements. Should the weight 48 be omitted, the hook 42 will not be operated to release the support 10 after the material has flowed off the plate 47, and it will then be necessary to operate said hook by hand. In place of the parts 45, 46, and 47 a spring may be applied to the hook 42, tending to throw said hook forward, which will then have to be unhooked by hand, as in the case of the construction last referred to. This form of construction will be convenient when it is desired to weigh only a single portion of material and continuous operation is not desired. In case it is not desired to cause a partial closing of the valve 17 prior to the completion of the load the armature 29 will be secured directly to said valve or to some part movable therewith.

In Fig. 6 is shown another modification of my invention according to which the support 10 is positively connected to the valve 17 by means of a link 75, so that said valve will be opened and closed directly by the movement of said support. The excess of the weight of the counterbalance 63 over the empty bucket 1 provides a means for opening the valve 17, as in the case of the other forms of the machine, while the excess of the weight of the filled bucket over the counterbalance provides power for closing the valve, the latter excess weight being accumulated after the valve 17 has been closed into the drip-stream position, as shown in Fig. 6, since the parts are retained in that position by the magnet 32, as above explained. In other words, the accumulation of the material necessary to complete the load provides a quickly-acting force constantly tending to close the valve 17 and operating so to do upon the breaking of the circuit through the magnet 32.

In Fig. 6 I have shown also a device for locking the operative parts of the machine after a predetermined number of operations. My preferred construction comprises a shaft 74, to which is attached at its inner end a hook 69, while upon the outer end of said shaft is secured a weighted arm 66. A hook 70 is secured to the under side of the support 10 in position to be engaged by the hook 69 when said support is in its lowest position. Turning loosely upon the shaft 74 is a ratchet 68, secured to a plate 64, from which plate project a number of pins 65. An arm 67, secured to the support 10, is provided with projecting ears 72 and 73, so located as to form, with the pins 65, a species of escapement, acting to permit the passage of one pin 65 upon each operation of the weighing-machine. The arm 66 is also provided with a spring-pawl 71, arranged to engage the teeth of the ratchet 68, so that by reason of its weighted end said arm will tend to turn the ratchet 68 and will turn it through the space between two of the pins 65 whenever one of said pins is permitted by an oscillation of the support 10 to pass the escapement formed by the ears 72 and 73. By lifting the arm 66 sufficiently to cause the pawl 71 to engage the second tooth passed by it as it is moved along the ratchet 68 the hook 69 will be moved away from the hook 70 sufficiently to allow the weighing-machine to complete two operations before said hook 69 will again engage the hook 70, and when this occurs the further operation of the machine will be arrested. If the arm 66 be raised sufficiently to move the pawl 71 past a different number of teeth, a corresponding number of operations will be performed by the machine before it is again locked. It will be apparent that this locking device is applicable to all of the modifications of my invention herein shown and, in fact, to any weighing-machine which contains a movable support similar in its mode of operation to my support 10.

In case it is desired to have the machine perform a large number of operations before stopping the locking device above described may be modified by providing the shaft 74 with means, such as a spring, for rotating it to a greater extent, since in such case it may be necessary to cause the arm 66 to perform nearly a complete revolution.

I claim as my invention—

1. In an automatic weighing-machine, the combination of a vertically-movable support, a scale carried thereby, a supply-chute and a valve controlling the same, valve-opening means arranged to be operated by said support on its upward movement only, means independent of the support constantly tending to close the valve, a valve-restraining device, and means operative with the poising of the scale for permitting the closing of the valve.

2. In an automatic weighing-machine, the combination of a vertically-movable support, a scale carried thereby, a supply-chute and a valve controlling the same, valve-opening connections between said support and valve, means constantly tending to close the valve, a magnet and valve-restraining means movable with the armature thereof, and means operative with the poising of the scale for deenergizing said magnet.

3. In an automatic weighing-machine, the combination of a pivoted support, a scale carried thereby and located wholly on one side of the axis on which said support turns, a supply chute and a valve controlling the same, means constantly tending to close said valve, a valve-restraining device, valve-opening connections between the support and valve, and means operative with the poising of the scale for permitting the closing of the valve.

4. In an automatic weighing-machine, the combination of a vertically-movable support, a scale carried thereby, a supply-chute and a valve controlling the same, valve-opening means arranged to be operated by said support on its upward movement only, means independent of the support constantly tending to close the valve, means for arresting the closing movement of the valve after a partial closing thereof has been effected, and means operative with the poising of the scale for permitting the closing of the valve.

5. In an automatic weighing-machine, the combination of a supply-chute and a valve controlling the same, means constantly tending to close said valve, means for arresting the valve when partly closed, comprising a magnet and a stop movable with the armature thereof, a movable support and connections between the same and said valve for opening the latter, a scale carried by said support, and means for deenergizing said magnet upon the poising of the scale.

6. In an automatic weighing-machine, the combination of a supply-chute and a valve controlling the same, means constantly tending to close said valve, a magnet and valve-restraining means movable with the armature thereof, a movable support and a valve-opening link connected to said support and slotted at its upper end, a pin carried by the valve and movable in said slot, a scale carried by said support and means for deenergizing said magnet upon the poising of the scale.

7. In an automatic weighing-machine, the combination with a movable support and a scale carried thereby, of a shaft, a supply-controlling valve secured thereto, an electromagnet included in circuit with a circuit-breaker adapted to be operated by a movement of said scale, an arm journaled on said shaft and provided with an armature and with a hooked end adapted to engage a lug on said valve and thereby hold the same in a partly-closed position, means for opening said valve adapted to be operated by the upward movement of said support, and means constantly tending to close said valve.

8. In an automatic weighing-machine, the combination of a movable support, a scale-beam carried thereby, a receptacle carried by said scale-beam and having a bottom adapted to open and close, a latch arranged to lock said bottom closed and to be released by the downward movement of the receptacle, means for arresting the downward movement of said support prior to the completion of a load in the receptacle, and means for releasing said support when said load has been completed.

9. In an automatic weighing-machine, the combination of a supply-controlling valve, a movable support carrying a scale-beam and provided with an arm and a roller, a receptacle carried by said scale-beam and provided with a hinged bottom arranged to be opened upon the downward movement of the support, means for closing said valve upon the completion of a load, and an arc-shaped flange movable with said valve and arranged to support said roller when the valve is open.

10. In an automatic weighing-machine, the combination of a supply-chute and a valve controlling the same, a movable support, a scale carried thereby, means operative with the upward movement of said support for opening said valve, and means for automatically locking said support in its load-discharging position after a predetermined number of operations.

11. In an automatic weighing-machine, the combination of a supply-chute and a valve controlling the same, a movable support, a scale-beam carried thereby, a receptacle suspended on said scale-beam, means operative with the upward movement of said support for opening the valve, a latch arranged to lock said support when in its load-discharging position, a plate operatively connected to said latch and located below the bottom of said receptacle and in the path of the material discharged therefrom, and means for lifting said plate after the material has fallen away from the same.

12. In an automatic weighing-machine, the combination with a valve and means constantly tending to close the same, of a movable support, a scale carried thereby, valve-opening means comprising a link pivoted at one end to said support and slotted at its other end to engage a pin carried by said valve, and means operative with the tilting of said scale for releasing said valve.

13. In an automatic weighing-machine, the combination of a chute 16, a valve 17, means constantly tending to close said valve, an arm 28 loosely pivoted on the axis of said valve and carrying an armature and an arm 30 provided with a hooked end adapted to engage a lug 31 on said valve, a magnet 32 adapted when energized to hold the valve in a partly-open position, a counterbalanced support carrying a scale, a valve-opening link 22 pivoted to said support and operatively connected to said valve, a circuit-breaker included in the circuit of said magnet and adapted to be operated by the movement of said scale, and a latch adapted to lock said support after it has been caused to descend by the completion of a load.

14. In an automatic weighing-machine, the combination with weighing mechanism of an automatic locking device comprising a rotatable shaft carrying a locking member adapted to engage a portion of the weighing mechanism and thereby lock the same against further movement, a disk mounted on said shaft and arranged to be rotated by the same, an escapement operative with the weighing mechanism for permitting a step-by-step rotation of said disk, and means for varying the initial relative position of said disk and shaft.

15. In an automatic weighing-machine, the combination with weighing mechanism of an automatic locking device comprising a shaft carrying a hook and a weighted arm, a disk mounted loosely upon said shaft and provided with a ratchet and a series of pins, a pawl carried by said arm and adapted to engage said ratchet, and a pair of lugs secured to and movable with the weighing mechanism and forming an escapement for said pins.

EDWARD G. THOMAS.

Witnesses:
 E. C. Ford,
 Geo. B. Glidden.